US008711241B2

(12) United States Patent
Kotani

(10) Patent No.: US 8,711,241 B2
(45) Date of Patent: Apr. 29, 2014

(54) IMAGE CAPTURING APPARATUS, CONTROL METHOD THEREOF, AND PROGRAM

(75) Inventor: Takuya Kotani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1555 days.

(21) Appl. No.: 11/622,087

(22) Filed: Jan. 11, 2007

(65) Prior Publication Data

US 2007/0159551 A1  Jul. 12, 2007

(30) Foreign Application Priority Data

Jan. 12, 2006  (JP) ................................. 2006-005396
Aug. 2, 2006  (JP) ................................. 2006-211379

(51) Int. Cl.
  *H04N 5/228* (2006.01)
  *H04N 5/217* (2011.01)
  *G03B 13/00* (2006.01)

(52) U.S. Cl.
  USPC ........................ 348/222.1; 348/241; 348/345

(58) Field of Classification Search
  USPC ......... 348/241, 246, 248, 251, 360, 363, 345, 348/255, 207.99, 222.1, 340; 382/300, 275, 382/117, 118
  See application file for complete search history.

(56) References Cited

U.S. PATENT DOCUMENTS

| 6,940,550 B2 * | 9/2005 | Kitawaki et al. ............. 348/246 |
| 7,295,233 B2 | 11/2007 | Steinberg et al. |
| 7,349,014 B2 * | 3/2008 | Higashihara ................. 348/241 |
| 7,358,994 B2 * | 4/2008 | Yano ............................ 348/254 |
| 7,590,305 B2 | 9/2009 | Steinberg et al. |
| 7,705,906 B2 * | 4/2010 | Watanabe ..................... 348/340 |
| 7,853,097 B2 | 12/2010 | Ishiga |
| 2002/0093577 A1 * | 7/2002 | Kitawaki et al. .............. 348/241 |

(Continued)

FOREIGN PATENT DOCUMENTS

| EP | 1394740 A2 | 3/2004 |
| GB | 2395781 A | 6/2004 |

(Continued)

OTHER PUBLICATIONS

The above reference was cited in a Jan. 15, 2010 Chinese Office Action, with English Translation, that issued in Chinese Patent Application No. 200710000579.1.
The above reference was cited in a Oct. 28, 2009 US Office Action that issued in related U.S. Appl. No. 11/622,071.

(Continued)

*Primary Examiner* — Ahmed A Berhan
(74) *Attorney, Agent, or Firm* — Cowan, Liebowitz & Latman, P.C.

(57) ABSTRACT

This invention enables suppression of the influence on a captured image of dust even when dust sticks to an image sensor, a protective glass fixed on the image sensor, or a filter. An image capturing apparatus includes an image sensor which generates an image signal by photo-electric conversion of an object image, a dust position detection unit which detects, from a dust detection image signal as the image signal generated by causing the image sensor to capture a dust detection object as an object having an almost uniform color, dust position information that is information of the position and size of dust in the image sensing plane of the image sensor, a lens information acquisition unit which acquires lens information of a lens used upon capturing the object, and a recording unit which records the dust position information detected by the dust position detection unit and the lens information acquired by the lens information acquisition unit in association with captured image data.

8 Claims, 17 Drawing Sheets

(56) References Cited

U.S. PATENT DOCUMENTS

| | | |
|---|---|---|
| 2004/0021779 A1 | 2/2004 | Yano |
| 2004/0041926 A1* | 3/2004 | Takano et al. ............. 348/241 |
| 2005/0068452 A1 | 3/2005 | Steinberg et al. |

FOREIGN PATENT DOCUMENTS

| | | |
|---|---|---|
| JP | 2001-223894 | 8/2001 |
| JP | 2004-062651 | 2/2004 |
| JP | 2004-193729 A | 7/2004 |
| JP | 2004-222231 | 8/2004 |

OTHER PUBLICATIONS

The above references were cited in a Oct. 14, 2011 US Notice of Allowance that issued in related U.S. Appl. No. 11/622,071.

The above reference was cited in a Aug. 31, 2011 European Search Report of the counterpart European Patent Application No. 07100433.7.

The above references were cited in a Partial European Search Report issued on Mar. 4, 2011, that issued in the corresponding European Patent Application No. 07100433.7.

Jun. 11, 2012 European Office Action, which is enclosed, that issued in European Patent Application No. 07100434.5.

* cited by examiner

FIG. 5

| ADDRESS OFFSET (Hex) | CODE (Hex) | MEANING |
|---|---|---|
| +00 | FF | Prefix |
| +01 | E0 | |
| +02 | | F-NUMBER (NUMERATOR) |
| +04 | | F-NUMBER (DENOMINATOR) |
| +06 | | LENS PUPIL POSITION (NUMERATOR) |
| +08 | | LENS PUPIL POSITION (DENOMINATOR) |
| +0A | | NUMBER OF DUST REGIONS |
| +0C | | PARAMETERS OF DUST REGION $D_1$<br>    RADIUS (2 BYTES)<br>    X-COORDINATE OF CENTER (2 BYTES)<br>    Y-COORDINATE OF CENTER (2 BYTES) |
| | | PARAMETERS OF DUST REGION $D_2$ |
| | | ... |
| | | PARAMETERS OF DUST REGION $D_n$ |

F I G. 16
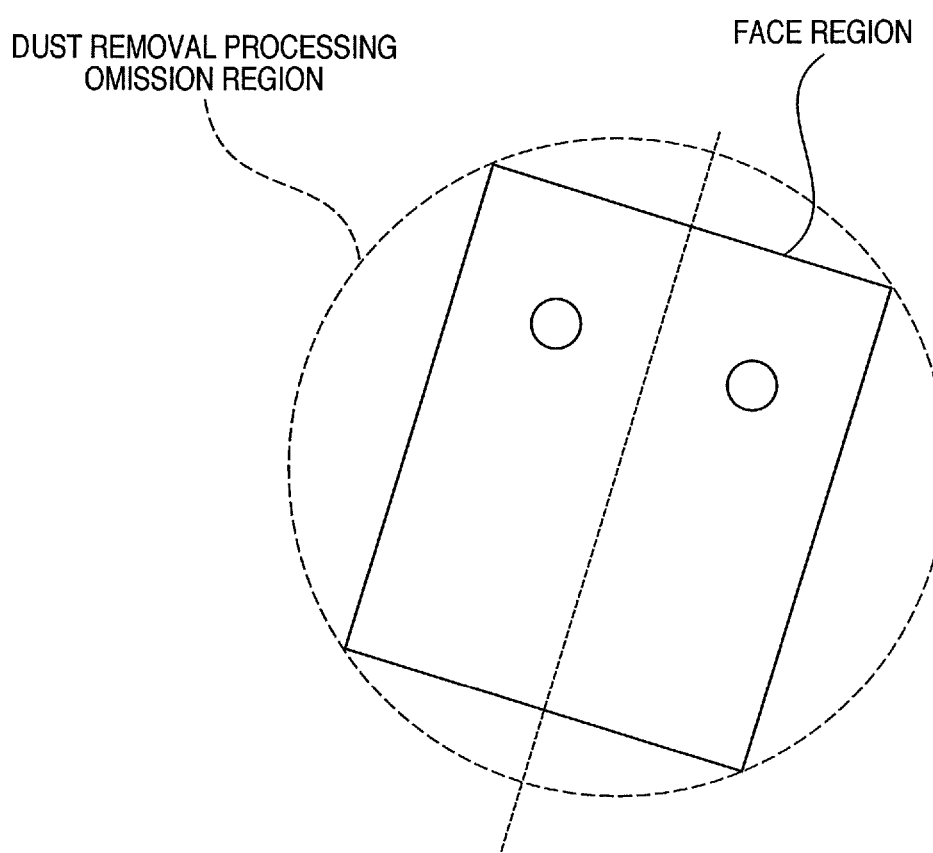

IMAGE CAPTURING APPARATUS, CONTROL METHOD THEREOF, AND PROGRAM

BACKGROUND OF THE INVENTION

1. Field of the Invention

The present invention relates to a technique of suppressing degradation of image quality caused by a foreign substance sticking to the surface of, for example, an optical low-pass filter in an image capturing apparatus using an image sensor such as a CCD or CMOS sensor.

2. Description of the Related Art

In recent years, many image capturing apparatus that generate an image signal by using an image sensor such as a CCD and record it as data are on the market, including digital cameras and digital video cameras. A digital camera requires no sensitive film that is conventionally used as a recording medium and instead records image data on a data recording medium such as a semiconductor memory card or hard disk device. Such a data recording medium allows repeated write and erase, unlike a film, and is very convenient due to a large reduction in the cost of related expendables.

A digital camera usually has an LCD (Liquid Crystal Display) monitor device capable of displaying a captured image, as needed, and a detachable mass storage device.

Use of a digital camera having the two devices makes it possible to capture an image without using film, which conventionally serves as an expendable recording medium, and display the captured image on the LCD monitor device and confirm its content immediately. It is possible to erase undesired image data on the spot or capture another image, as needed. When compared to a silver halide camera, the recording efficiency is much higher.

The scope in which digital cameras are being used is widening due to their convenience as well as to technical innovations, for example, which increase the number of pixels of an image sensor. There have also been recent increases in the number of digital cameras with interchangeable lenses, such as those of single-lens reflex cameras.

However, in digital cameras, foreign substances such as dust or dirt (to be simply referred to as dust hereinafter) sometimes sticks to the surface of, for example, an image sensor, an image sensor protective glass fixed on the image sensor, or to an optical filter or an optical system (to be referred to hereinafter as an image sensor/optical system component). If dust sticks to an image sensor/optical system component, the dust shields light and impedes image capture of that part, degrading the quality of the captured image.

Not only digital cameras but cameras using silver halide film also have the problem of dust being captured on film. However, since the film moves with every frame, the same dust is rarely captured on all frames.

However, the image sensor of a digital camera does not move, and image capture is executed using the same image sensor. Once dust sticks to an image sensor/optical system component, the same dust is captured on many frames (captured images). In particular, a lens-interchangeable digital camera readily catches dust in it upon lens exchange.

Hence, the photographer must always take care not to cause dust to stick to the image sensor/optical system component and must expend great effort to check for dust and remove it. In particular, the image sensor is located at a relatively deep point within the camera, and it is not easy to check and remove dust on it.

Dust easily enters a lens-interchangeable digital camera when lenses are exchanged. Many lens-interchangeable digital cameras have a focal plane shutter in front of the image sensor and it is easy for dust to stick to the image sensor/optical system component.

Dust on the image sensor normally sticks not to the surface of the image sensor but to the surface of the protective glass or optical filter. Hence, the imaging state changes depending on the aperture value of the photographing lens or the distance of the pupil position. More specifically, when the aperture value is close to a full-aperture state, defocusing occurs to make small dust unnoticeable. Conversely, when the aperture value is large, focusing on dust occurs and has an adverse effect on the image.

There is known a method of making dust unnoticeable, in which, for example, a white wall is captured in a stopped-down-aperture state to prepare an image containing only dust on the image sensor in advance, and the image is used in combination with a normal image (Japanese Patent Laid-Open No. 2004-222231). With this method, however, the user must always be aware of the correspondence between the image captured for dust detection and the group of actually captured images to be associated with the image; the result is cumbersome.

SUMMARY OF THE INVENTION

The present invention has been made in consideration of the above-described problems, and has as its object to suppress the influence on a captured image even when dust sticks to an image sensor, a protective glass fixed on the image sensor, or a filter.

In order to solve the above-described problems and achieve the object, according to the first aspect of the present invention, there is provided An image capturing apparatus comprising: an image capture unit configured to generate an image signal by photo-electric conversion of an object image, a foreign substance detection unit configured to detect, from a foreign substance detection image signal obtained by the image capture unit, foreign substance information that is information of a position and size of a foreign substance in an image sensing plane of the image capture unit, a lens information acquisition unit configured to acquire lens information of a lens used upon capturing the object, and a recording unit configured to record the foreign substance information detected by the foreign substance detection unit and the lens information acquired by the lens information acquisition unit in association with captured image data obtained by capturing the object.

According to the second aspect of the present invention, there is provided a method of controlling an image capturing apparatus having an image capture unit configured to generate an image signal by photo-electric conversion of an object image, comprising the steps of: detecting, from a foreign substance detection image signal obtained by the image capture unit, foreign substance information that is information of a position and size of a foreign substance in an image sensing plane of the image capture unit, acquiring lens information of a lens used upon capturing the object, and recording the foreign substance information detected in the foreign substance detecting step and the lens information acquired in the lens information acquiring step in association with captured image data obtained by capturing the object.

According to the third aspect of the present invention, there is provided a program characterized by causing a computer to execute the above control method.

According to the fourth aspect of the present invention, there is provided an image capturing apparatus comprising: an image capture unit configured to generate an image signal by photo-electric conversion of an object image, a foreign substance detection unit configured to detect, from a foreign substance detection image signal obtained by the image capture unit, foreign substance information that is information of a position and size of a foreign substance in an image sensing plane of the image capture unit, a lens information acquisition unit configured to acquire lens information of a lens used upon capturing the object, and a recording unit configured to convert the foreign substance information, detected by the foreign substance detection unit, on the basis of the lens information acquired by the lens information acquisition unit and recording the converted foreign substance information in association with captured image data obtained by capturing the object.

According to the fifth aspect of the present invention, there is provided a method of controlling an image capturing apparatus having image capture unit configured to generate an image signal by photo-electric conversion of an object image, comprising the steps of: detecting, from a foreign substance detection image signal obtained by the image capture unit, foreign substance information that is information of a position and size of a foreign substance in an image sensing plane of the image capture unit, acquiring lens information of a lens used upon capturing the object, and converting the foreign substance information, detected in the foreign substance detecting step, on the basis of the lens information acquired in the lens information acquiring step and recording the converted foreign substance information in association with captured image data obtained by capturing the object.

According to the sixth aspect of the present invention, there is provided a program characterized by causing a computer to execute the above control method.

According to the seventh aspect of the present invention, there is provided an image capturing apparatus comprising: an image capture unit configured to generate an image signal by photo-electric conversion of an object image, a foreign substance detection unit configured to detect, from a foreign substance detection image signal obtained by the image capture unit, foreign substance information that is information of a position and size of a foreign substance in an image sensing plane of the image capture unit, lens information acquisition unit configured to acquire lens information of a lens used upon capturing the object, face region detection unit configured to detect a region of a personal face from the captured image signal obtained by capturing the object, and recording unit configured to record the foreign substance information detected by the foreign substance detection unit, the lens information acquired by the lens information acquisition unit, and the face region information acquired by the face region detection unit in association with captured image data obtained by capturing the object.

According to the eighth aspect of the present invention, there is provided a method of controlling an image capturing apparatus having image capture unit configured to generate an image signal by photo-electric conversion of an object image, comprising the steps of: detecting, from a foreign substance detection image signal obtained by the image capture unit, foreign substance information that is information of a position and size of a foreign substance in an image sensing plane of the image capture unit, acquiring lens information of a lens used upon capturing the object, detecting a region of a personal face from the captured image signal obtained by capturing the object, and recording the foreign substance information detected in the foreign substance detecting step, the lens information acquired in the lens information acquiring step, and the face region information acquired in the face region detecting step in association with captured image data obtained by capturing the object.

According to the ninth aspect of the present invention, there is provided a program characterized by causing a computer to execute the above control method.

According to the present invention, it is possible to suppress the influence on a captured image even when dust sticks to an image sensor, a protective glass fixed on the image sensor, or a filter.

Further features of the present invention will become apparent from the following description of exemplary embodiments with reference to the attached drawings.

BRIEF DESCRIPTION OF THE DRAWINGS

FIG. 5 is a view showing a data format example of dust correction data;

FIG. 16 is a view showing a dust removal processing omission region according to the fourth embodiment.

DESCRIPTION OF THE EMBODIMENTS

Preferred embodiments of the present invention will be described below in detail with reference to the accompanying drawings.

First Embodiment

In this embodiment, a case will be described in which a camera body detects dust and attaches dust correction data to image data, and an image processing apparatus outside the camera executes processing of removing the dust from the image data by using the dust correction data attached to the image data.

Figure 1:
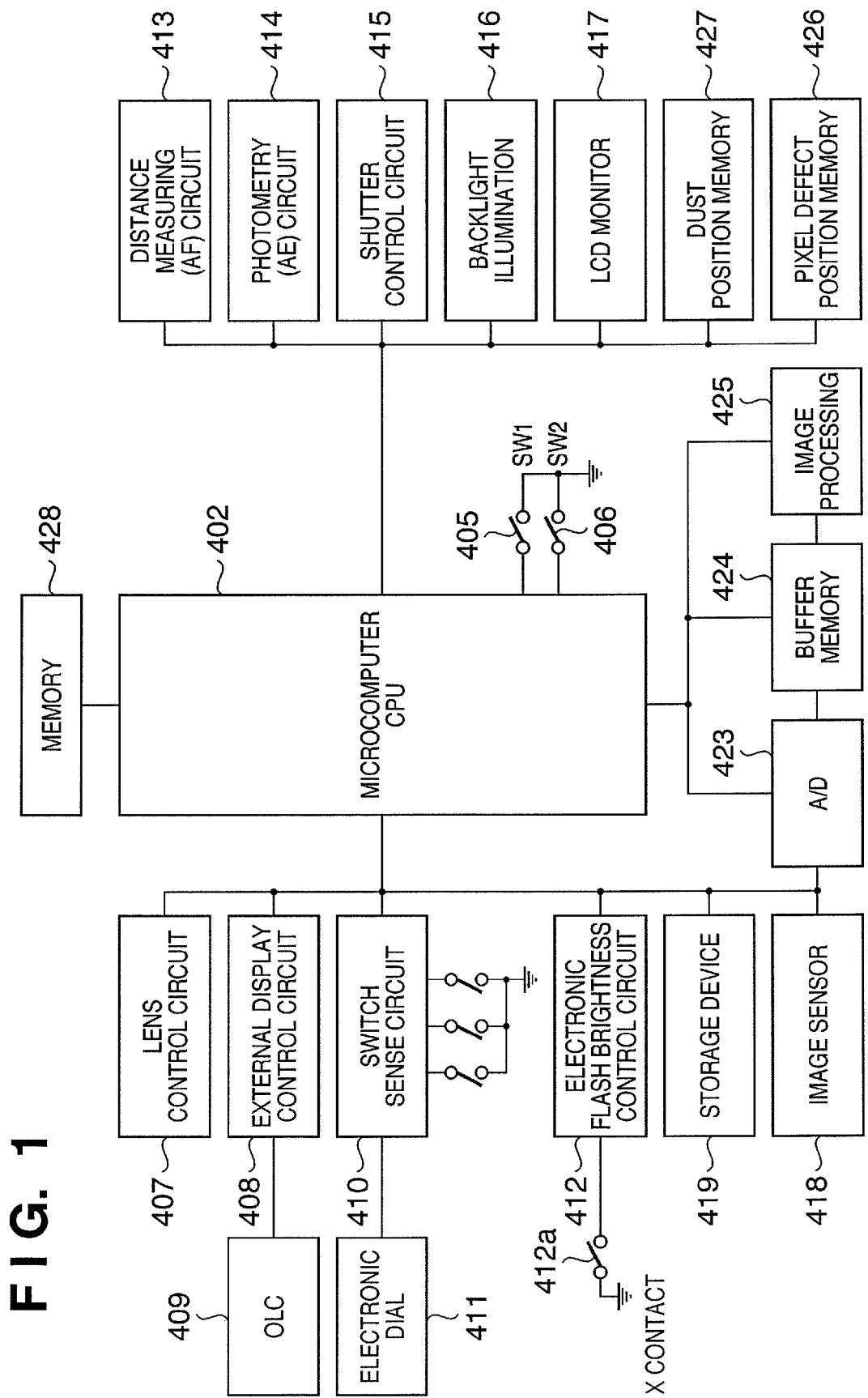
FIG. 1 is a block diagram showing the circuit arrangement of a lens-interchangeable single-lens reflex digital camera which serves as an image capturing apparatus according to the first embodiment of the present invention.

FIG. 1 is a block diagram showing the circuit arrangement of a lens-interchangeable single-lens reflex digital camera which serves as an image capturing apparatus according to the first embodiment of the present invention.

Referring to FIG. 1, a microcomputer 402 controls the operation of the entire camera, including processing of image data output from an image sensor (CCD in this embodiment) 418 and display on an LCD monitor device 417.

Figure 2:
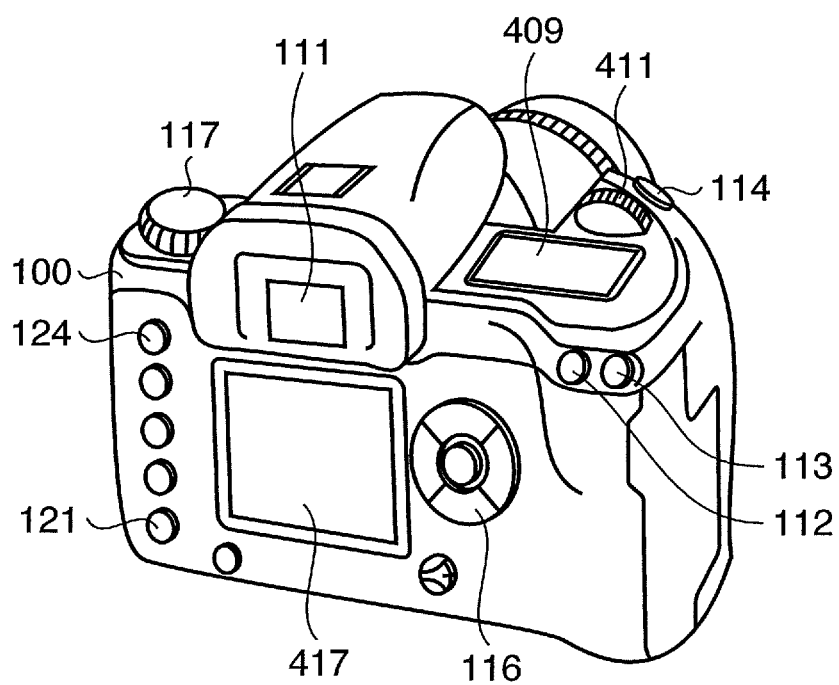
FIG. 2 is a perspective view showing the outer appearance of the digital camera according to the first embodiment.

A switch (SW1) 405 is turned on in a half depressed state of a release button 114 (FIG. 2). When the switch (SW1) 405 is ON, the digital camera of this embodiment is ready for image capturing. A switch (SW2) 406 is turned on in a fully depressed state of the release button 114. When the switch (SW2) 406 is turned on, the digital camera of this embodiment starts image capturing.

A lens control circuit 407 communicates with a photographing lens 200 (FIG. 3) and controls driving of the photographing lens 200 and driving of the aperture blades upon AF (Auto Focus).

Referring to FIG. 1, an external display control circuit 408 controls an external display device (OLC) 409 and a display device (not shown) in the viewfinder. A switch sense circuit 410 transmits, to the microcomputer 402, signals from a number of switches including an electronic dial 411 provided on the camera.

An electronic flash brightness control circuit 412 is grounded via an X contact 412a and controls an external electronic flash. A distance measuring circuit 413 detects a defocus amount with respect to an object for AF. A photometry circuit 414 measures the brightness of an object.

A shutter control circuit 415 controls a shutter to execute proper exposure for the image sensor. The LCD monitor device 417 and a backlight illumination device 416 constitute an image display device. A storage device 419 includes, for example, a hard disk drive or a semiconductor memory card detachable from the camera body.

An A/D converter 423, an image buffer memory 424, an image processing circuit 425 including a Digital Signal Processor (DSP), and a pixel defect position memory 426 to store information representing that a predetermined pixel itself in the image sensor has a defect connect to the microcomputer 402. A dust position memory 427 to store a pixel position in the image sensor where an image error occurs due to dust also connects to the microcomputer 402. The pixel defect position memory 426 and dust position memory 427 preferably use a nonvolatile memory. The pixel defect position memory 426 and dust position memory 427 may store data by using different addresses of the same memory space.

A nonvolatile memory 428 stores, for example, programs to be executed by the microcomputer 402.

Figure 3:
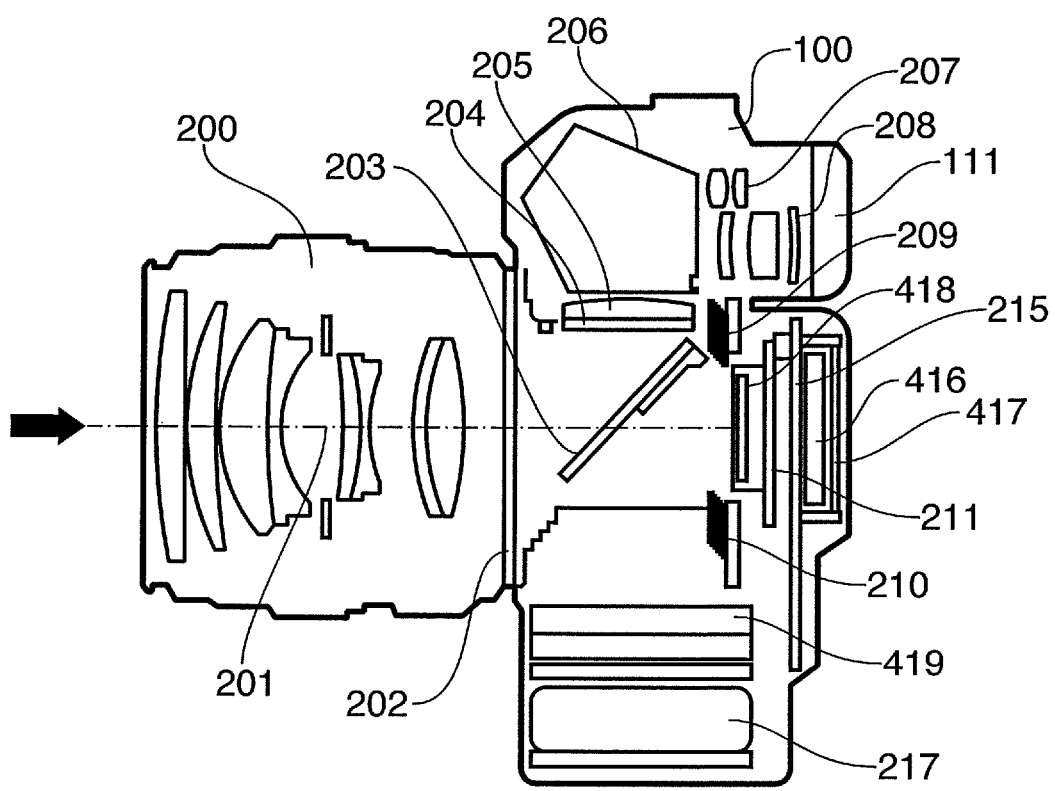
FIG. 3 is a longitudinal sectional view showing the internal structure of the digital camera according to the first embodiment.

FIG. 2 is a perspective view showing the outer appearance of the digital camera according to this embodiment. FIG. 3 is a longitudinal sectional view of FIG. 2.

Referring to FIG. 2, a camera body 100 has, on the upper side, an eyepiece window 111 for viewfinder observation, an AS (Automatic Exposure) lock button 112, an AF distance measuring point selection button 113, and the release button 114 for the image capture operation. The electronic dial 411, image capture mode selection dial 117, and external display device 409 are also provided. The electronic dial 411 is a multifunction signal input device that inputs a numerical value to the camera or switches the image capture mode in cooperation with other operation buttons. The external display device 409 including a liquid display device displays image capture conditions such as the shutter speed, aperture value, and image capture mode and other information.

The camera body 100 has, on its rear surface, the LCD monitor device 417 to display a captured image and various kinds of setting windows, a monitor switch 121 to turn on/off the LCD monitor device 417, a cursor switch 116, and a menu button 124.

The cursor switch 116 has four buttons arranged on the upper, lower, left, and right sides and a SET button arranged at the center. The user uses the cursor switch 116 to instruct the camera to select or execute a menu item displayed on the LCD monitor device 417.

The menu button 124 displays, on the LCD monitor device 417, a menu window to do various kinds of setting of the camera. To select and set, for example, the image capture mode, the user presses the menu button 124, selects a desired mode by operating the upper, lower, left, and right buttons of the cursor switch 116, and presses the SET button while keeping the desired mode selected, thereby completing setting. The menu button 124 and cursor switch 116 are also used to set a dust mode (to be described later) and set a display mode and identification mark in the dust mode.

The LCD monitor device 417 of this embodiment is of a transmission type so the user cannot visually recognize any image only by driving the LCD monitor device. The LCD monitor device 417 always requires the backlight illumination device 416 on its rear side, as shown in FIG. 3. The LCD monitor device 417 and backlight illumination device 416 constitute an image display device.

As shown in FIG. 3, the photographing lens 200 of the image capture optical system is detachably attached to the camera body 100 via a lens mount 202. Referring to FIG. 3, reference numeral 201 denotes an image capture optical axis; and 203, a quick return mirror.

The quick return mirror 203 arranged in the image capture optical path is movable between a position (position shown in FIG. 3 which will be referred to as an inclined position) to guide object light from the photographing lens 200 to the viewfinder optical system and a position (to be referred to as a retreat position) to retreat from the image capture optical path.

Referring to FIG. 3, an image of object light guided from the quick return mirror 203 to the viewfinder optical system is formed on a focusing screen 204. A condenser lens 205 improves the visibility of the viewfinder. A pentagonal roof prism 206 guides the object light that has passed through the focusing screen 204 and condenser lens 205 to an eyepiece 208 for viewfinder observation and a photometry sensor 207.

A shutter includes a front curtain 209 and a rear curtain 210. When the front curtain 209 and rear curtain 210 are open, the image sensor 418 serving as a solid-state image sensor arranged on the rear side is exposed for a necessary period of time. A captured image converted into an electrical signal for each pixel by the image sensor 418 is processed by the A/D converter 423 and image processing circuit 425 and recorded in the storage device 419 as image data.

The image sensor 418 is held on a printed circuit board 211. Another printed circuit board, i.e., a display board 215 is arranged on the rear side of the printed circuit board 211. The LCD monitor device 417 and backlight illumination device 416 are arranged on the opposite surface of the display board 215.

The storage device 419 records image data. Reference numeral 217 denotes a battery (portable power supply). The storage device 419 and battery 217 are detachable from the camera body.

(Dust Detection Processing)

Figure 4:
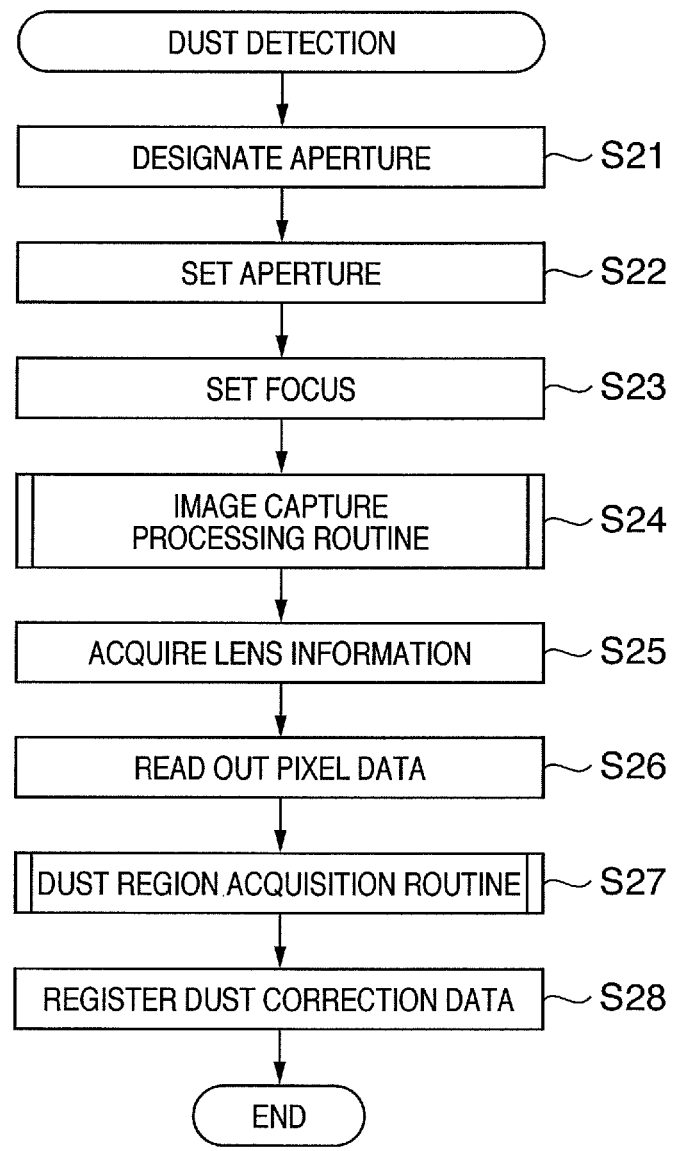
FIG. 4 is a flowchart for explaining dust detection processing of the digital camera according to the first embodiment.

FIG. 4 is a flowchart for explaining dust detection processing (processing of detecting a pixel position where an image error occurs due to dust) of the digital camera according to this embodiment. This processing is done by causing the microcomputer 402 to execute a dust detection processing program stored in the memory 428.

Dust detection processing is executed by capturing a dust detection image. To do dust detection processing, the camera is installed while keeping the image capture optical axis 201 of the photographing lens 200 directed to a surface with a uniform color such as the exit surface of a surface source or a white wall, thereby preparing for dust detection. Alternatively, a light unit (a small point source device attached in place of a lens) for dust detection is attached to the lens mount 202 to prepare for dust detection. The light unit can employ, for example, a white LED as its light source and preferably adjusts the light-emitting surface size in correspondence with a predetermined aperture value (for example, F64 in this embodiment).

In the example of this embodiment, a normal photographing lens is used. Instead, dust detection may be done by attaching the light unit to the lens mount 202. In this embodiment, the dust detection image is an image having a uniform color, as described above.

When preparation ends, and the user inputs a dust detection processing start instruction from, for example, the cursor switch 116, the microcomputer 402 sets the aperture first. The imaging state of dust near the image sensor changes depending on the aperture value of the lens. The position of dust changes depending on the lens pupil position. Hence, dust correction data must hold the aperture value and the lens pupil position upon detection in addition to the position and size of dust.

If it is predetermined to always use the same aperture value independently of the lens in generating dust correction data, the dust correction data need not always hold the aperture value. In addition, it is also unnecessary to hold the pupil position in the dust correction data if the light unit is used, or only use of a specific lens is permitted. In other words, if use of a plurality of lenses is permitted, or the aperture value is to be changed as needed, it is necessary to hold, in the dust correction data, the aperture value and the lens pupil position upon detection. The pupil position indicates the distance from the image sensing plane (focal plane) of the exit pupil.

For example, F16 is designated (step S21).

The microcomputer 402 causes the lens control circuit 407 to control the aperture blades of the photographing lens 200 to set the aperture to the aperture value designated in step S21 (step S22). In addition, the microcomputer 402 sets the focus position to the infinite distance (step S23).

When the aperture value and focus position of the photographing lens are set, image capturing in the dust detection mode is executed (step S24). The image capture processing routine executed in step S24 will be described later in detail with reference to FIG. 9. Obtained image data is stored in the image buffer memory 424.

When image capturing ends, the aperture value and lens pupil position upon image capturing are acquired (step S25). Data corresponding to each pixel of the captured image stored in the image buffer memory 424 is loaded to the image processing circuit 425 (step S26). The image processing circuit 425 executes processing shown in FIG. 6 to acquire the positions and size of pixels with dust (step S27). The positions and size of the pixels with dust acquired in step S27 and the aperture value and lens pupil position information acquired in step S25 are registered in the dust position memory 427 (step S28). When the above-described light unit is used, no lens information can be acquired. If no lens information is acquired, it is determined that the light unit was used. In this case, predetermined lens pupil position information and a reduced aperture value calculated from the light source diameter of the light unit are registered.

In step S28, the position of each defective pixel (pixel defect) in manufacturing, which is recorded in the pixel defect position memory in advance, is compared with the position of each readout pixel data to confirm whether a pixel defect is present. The position of only a region determined to have a defect other than a pixel defect is registered in the dust position memory 427.

FIG. 5 is a view showing a data format example of dust correction data stored in the dust position memory 427. As shown in FIG. 5, lens information and information representing the position and size of dust upon capturing a detection image are stored as dust correction data. The dust correction data is added to an image together with the information of image data upon acquisition and used by dust removal processing to be described later.

More specifically, an actual aperture value (F-number) and lens pupil position upon capturing a detection image are stored as lens information upon capturing a detection image. The number (integral value) of detected dust regions is stored in the storage area. Then, individual parameters of each dust region are stored repeatedly in correspondence with the number of dust regions. The dust region parameters include a set of three numerical values: the radius (for example, 2 bytes) of dust, the x-coordinate (for example, 2 bytes) of the center of the effective image region, and the y-coordinate (for example, 2 bytes) of the center.

If the dust correction data size is restricted by, for example, the capacity of the dust position memory 427, data are preferentially stored in the chronological order of dust regions obtained in step S27. This is because the dust region acquisition routine in step S27 sorts the dust regions in descending order of visibility.

(Dust Region Acquisition Routine)

The dust region acquisition routine in step S27 will be described next in detail with reference to FIGS. 6 to 8.

Figure 7:
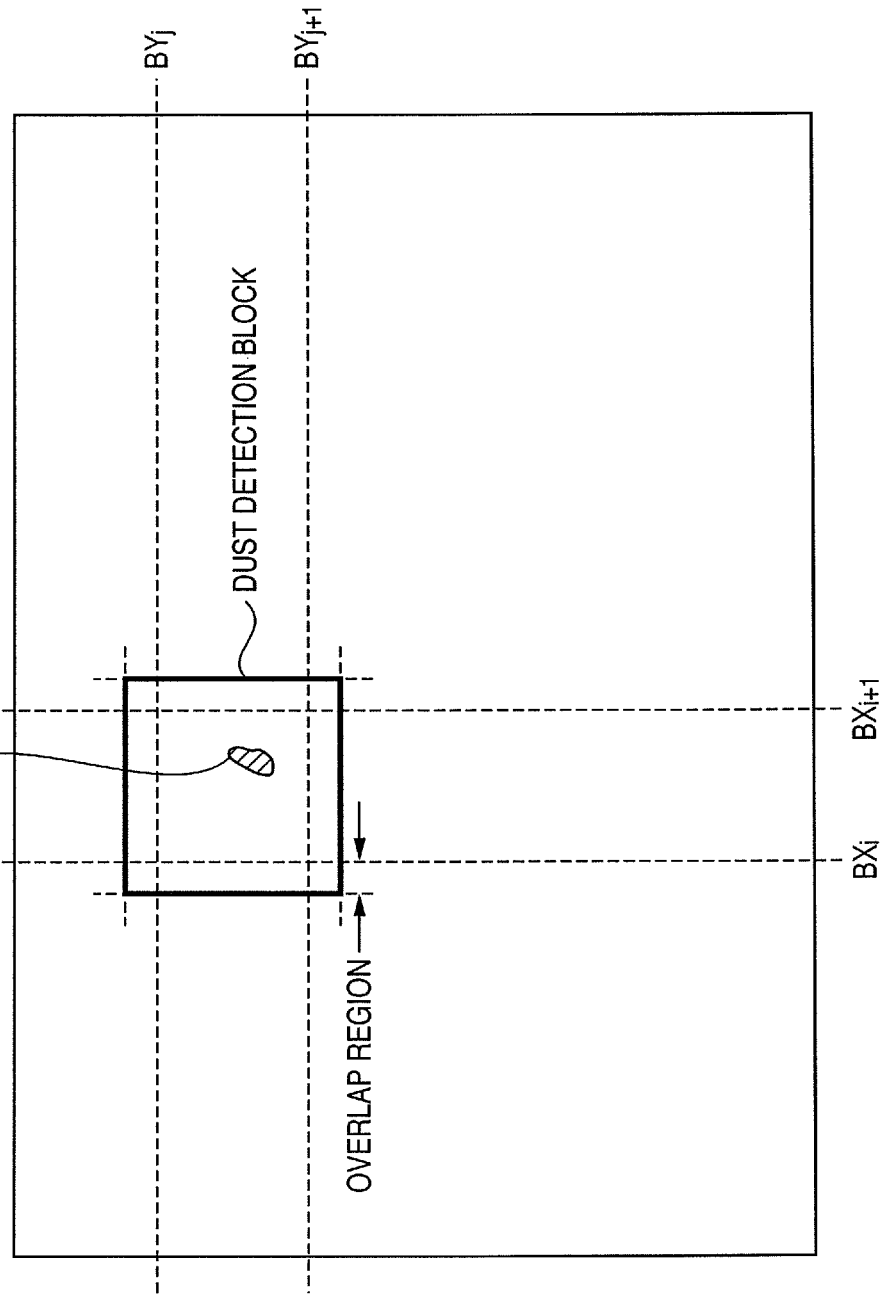
FIG. 7 is a view showing the process unit of dust region determination processing in step S62 of FIG. 6.

As shown in FIG. 7, readout image data is rasterized on the memory, and each predetermined block is processed. The image data is segmented into blocks to cope with limb darkening caused by the lens or sensor characteristic. Limb darkening is a phenomenon to decrease the brightness of the peripheral portion of a lens as compared to the central portion. Limb darkening decreases in the stopped-down-aperture state, as is known. Even in the stopped-down-aperture state, however, it is impossible for some lenses to accurately detect dust at the peripheral portion if the dust position is determined on the basis of a threshold value predetermined for a captured image. To prevent this, the influence of limb darkening is reduced by segmenting image data into blocks.

Simple block segmentation poses such a problem that if the threshold value changes between blocks, the dust detection position across the blocks becomes inaccurate. To prevent this, the blocks are overlapped, and a pixel determined to be dust in any one of blocks included in the overlap region is handled as a dust region.

Figure 6:
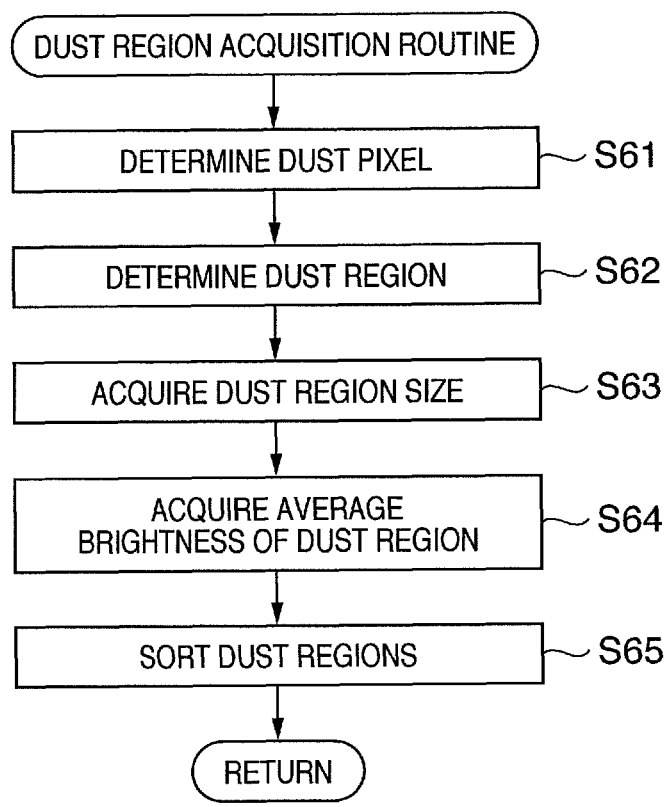
FIG. 6 is a flowchart for explaining details of a dust region acquisition routine in step S27 of FIG. 4.

Dust region determination in a block is done in accordance the procedure shown in FIG. 6. A maximum brightness Lmax and an average brightness Lave in the block are calculated. A threshold value T1 in the block is calculated by $$T1 = Lave \times 0.6 + Lmax \times 0.4$$

A pixel having a brightness value smaller than the threshold value is regarded as a dust pixel (step S61). An isolated region formed by dust pixels is defined as one dust region di (i=0, 1, ..., n) (step S62). As shown in FIG. 8, for each dust region, a maximum value Xmax and minimum value Xmin of the horizontal coordinates of the pixels included in the dust region and a maximum value Ymax and minimum value Ymin of the vertical coordinates are obtained. A radius ri representing the size of the dust region di is calculated by the following equation (step S63).

$$ri=\sqrt{[\{(Xmax-Xmin)/2\}^2+\{(Ymax-Ymin)/2\}^2]}$$

Figure 8:
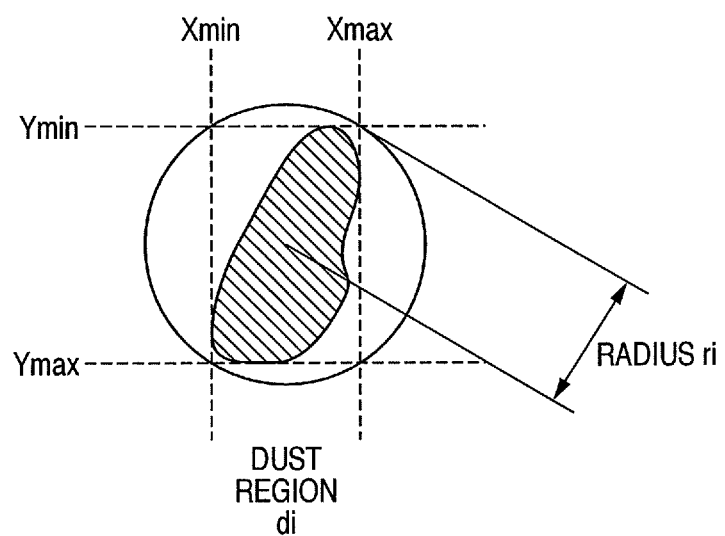
FIG. 8 is a view showing the outline of dust region size calculation in step S63 of FIG. 6.

FIG. 8 shows the relationship between Xmax, Ymax, Xmin, Ymin, and ri.

In step S64, the average brightness value of each dust region is calculated.

In some cases, the dust correction data size is restricted by, for example, the capacity of the dust position memory 427. To cope with such a case, the pieces of dust position information are sorted on the basis of the sizes or average brightness values of the dust regions (step S65). In this case, sorting is done in descending order of ri. If ri is the same, sorting is done in ascending order of average brightness values. This allows to preferentially register noticeable dust in the dust correction data. Let Di be a sorted dust region, and Ri be the radius of the dust region Di.

If a dust region larger than a predetermined size is present, it may be excluded from the sorting target and located at the end of the sorted dust region list. A large dust region may degrade the image quality by interpolation processing later and is therefore preferably handled as a correction target with the lowest priority.

(Image Capture Processing Routine)

Figure 9:
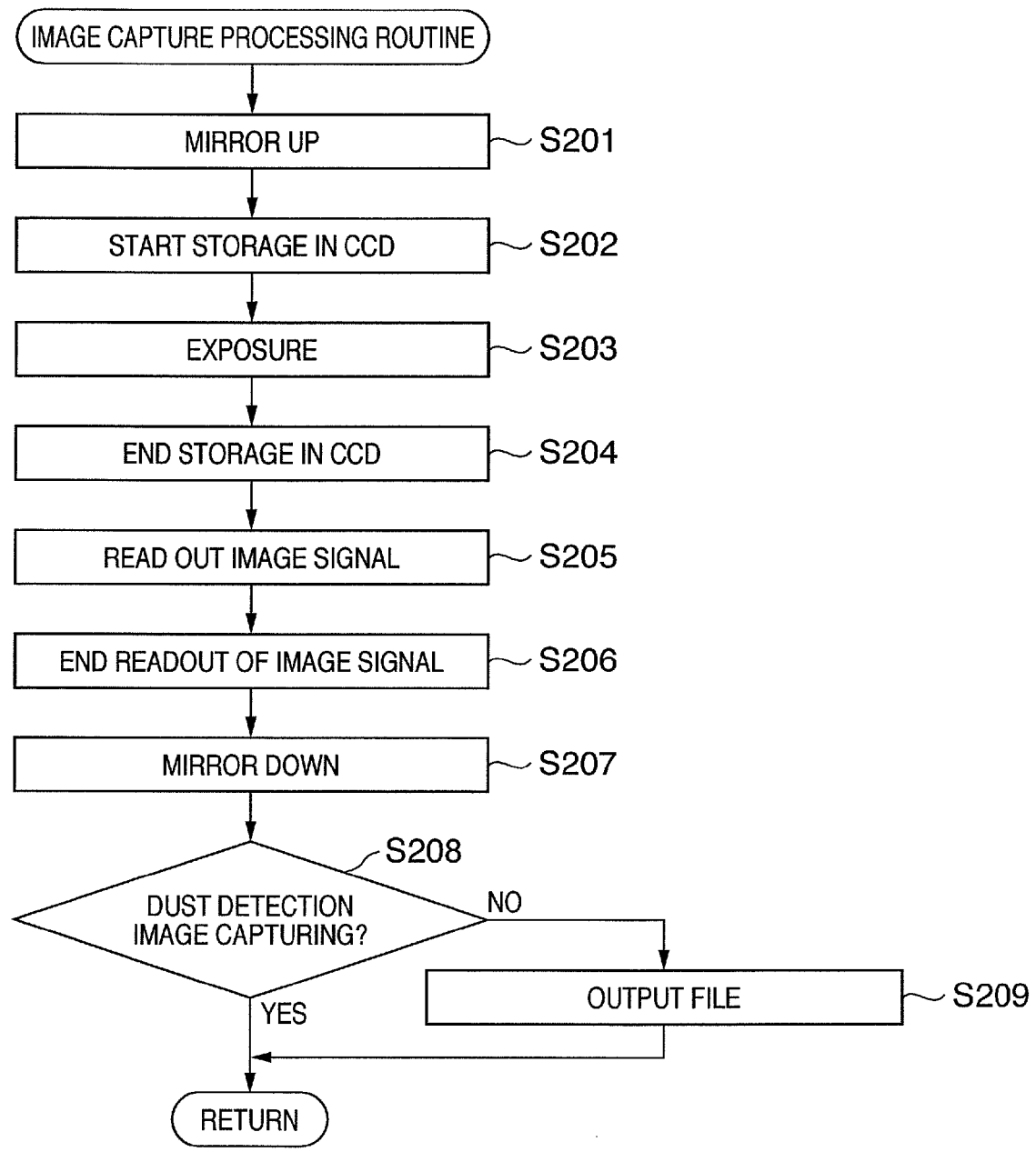
FIG. 9 is a flowchart for explaining details of an image capture processing routine in step S24 of FIG. 4.

The image capture processing routine in step S24 of FIG. 4 will be described next with reference to the flowchart in FIG. 9. This processing is done by causing the microcomputer 402 to execute an image capture processing program stored in the memory 428.

When the image capture processing routine starts, the microcomputer 402 actuates the quick return mirror 203 shown in FIG. 3 to do so-called mirror up in step S201 and make the quick return mirror 203 retreat from the image capture optical path.

In step S202, the image sensor starts storing charges. In step S203, the rear curtain 210 and front curtain 209 of the shutter shown in FIG. 3 are opened to execute exposure. In step S204, the image sensor ends charge storage. In step S205, the image signal is read out from the image sensor and processed by the A/D converter 423 and image processing circuit 425. The resultant image data is primarily stored in the image buffer memory 424.

When readout of all image signals from the image sensor is complete in step S206, the quick return mirror 203 is moved down in step S207 and returned to the inclined position, thereby ending the series of image capture operations.

In step S208, it is determined whether the operation is normal image capturing or dust detection image capturing. In the normal image capturing, the process advances to step S209 to record, in the storage device 419, the dust correction data shown in FIG. 5 together with the camera setting values upon image capturing in association with the image data.

More specifically, data association can be attained by additionally writing the dust correction data in, for example, an Exif region serving as the header region of an image file where the camera setting values upon image capturing are recorded. Data association may also be attained by recording the dust correction data as an independent file and recording, in the image data, only link information to the dust correction data file. However, if the image file and dust correction data file are separately recorded, the link relationship may be lost by image file moving. Hence, the dust correction data is preferably held integrally with the image data.

(Dust Removal Processing)

The procedure of dust removal processing will be described next. Dust removal processing is done not in the camera body but on a separately prepared image processing apparatus.

Figure 10:
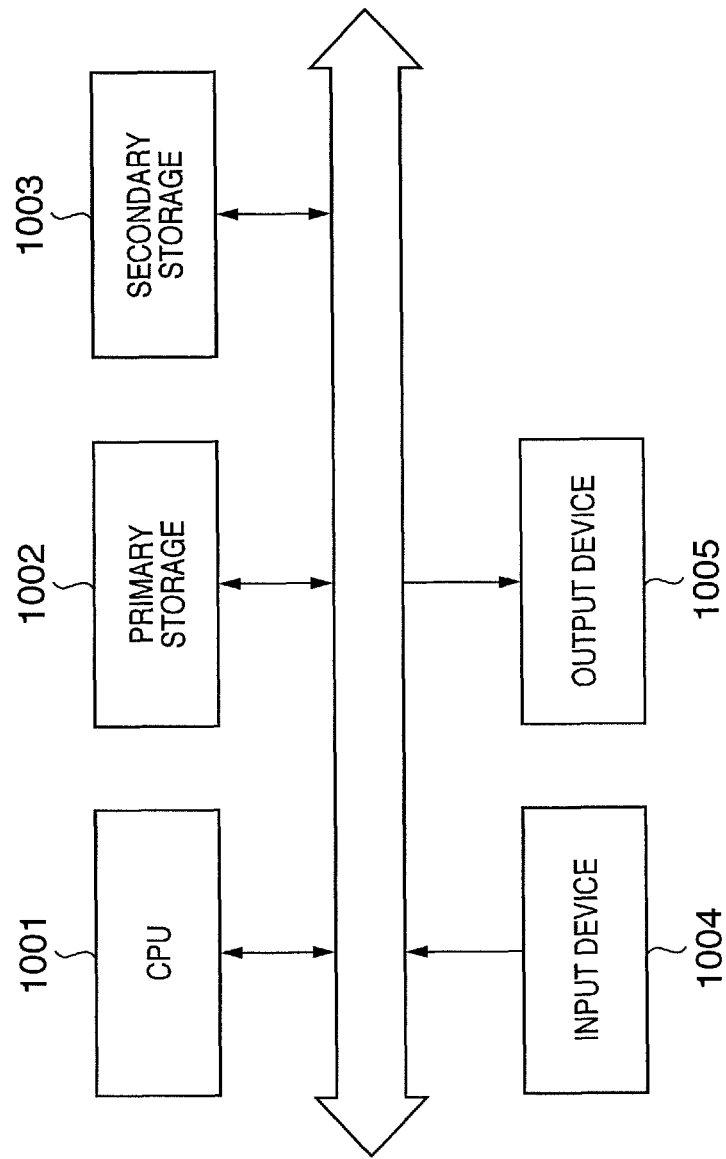
FIG. 10 is a block diagram showing the schematic system configuration of an image processing apparatus.

FIG. 10 is a block diagram showing the schematic system configuration of the image processing apparatus.

A CPU 1001 controls the operation of the whole system and executes, for example, a program stored in a primary storage unit 1002. The primary storage unit 1002 mainly includes a memory, which reads out a program from a secondary storage unit 1003 and stores it. The secondary storage unit 1003 corresponds to, for example, a hard disk. The capacity of the primary storage unit is generally smaller than that of the secondary storage unit. The secondary storage unit stores programs and data with a size beyond the capacity of the primary storage unit. The secondary storage unit also stores data that requires long time storage. In this embodiment, the secondary storage unit 1003 stores a program. To execute the program, the primary storage unit 1002 reads it out, and the CPU 1001 executes processing.

An input device 1004 corresponds to, for example, not only a mouse and keyboard used for system control but also a card reader, scanner, and film scanner necessary for inputting image data. Examples of an output device 1005 are a monitor and a printer. This apparatus can take various forms except that described above, though a description thereof will be omitted because it is not necessary for understanding of the present invention.

The image processing apparatus has an operating system capable of executing a plurality of programs in parallel. The operator can operate a program running on this apparatus by using GUI.

Figure 11:
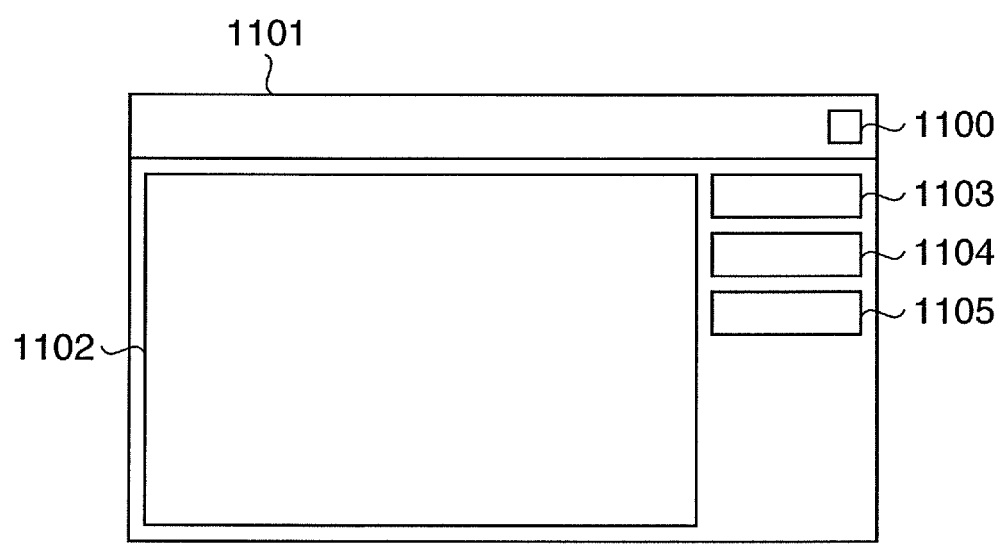
FIG. 11 is a view showing an example of GUI of the image processing apparatus.

FIG. 11 is a view showing an example of GUI (Graphical User Interface) of an image editing program in the image processing apparatus. A window has a close button 1100 and a title bar 1101. The program ends upon clicking on the close button. A file is dragged and dropped in an image display region 1102 to designate a correction target image. When the correction target image is determined, the file name is displayed on the title bar 1101, and the target image is Fit-displayed in the image display region 1102. Dust removal processing (to be described later) is executed by clicking on an execute button 1103 so that a processed image is displayed in the image display region 1102. When a step execute button 1104 is clicked on, steps of the dust removal processing (to be described later) are executed. When the processing ends for all dust regions, the processed image is displayed in the image display region 1102. The processed image is stored by clicking on a save button 1105.

Figure 12:
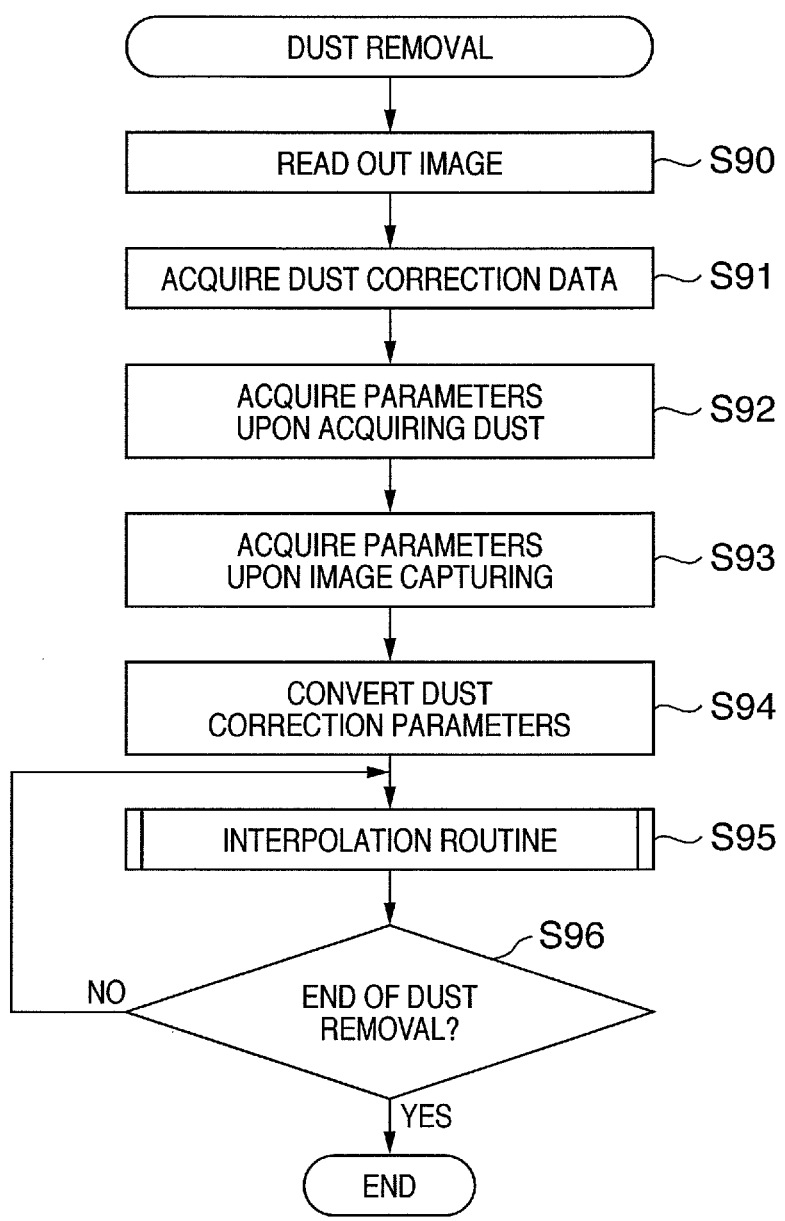
FIG. 12 is a flowchart for explaining details of dust removal processing.

FIG. 12 shows the procedure of dust removal processing by the image processing apparatus.

The image processing apparatus reads out normal captured image data with dust correction data from the digital camera or the storage device 419 detached from the digital camera and stores the data in the primary storage unit 1002 or secondary storage unit 1003 (step S90).

The dust correction data added to the captured image in step S209 is extracted from the normal captured image data (dust removal processing target) (step S91).

The coordinate sequence Di (i=0, 1, . . . , n), radius sequence Ri (i=0, 1, . . . , n), aperture value f1, and lens pupil position L1 are obtained from the dust correction data extracted in step S91 (step S92). Ri is the size of dust at the coordinates Di calculated in step S65 of FIG. 6. In step S93, an aperture value f2 and a lens pupil position L2 upon normal image capturing are acquired. In step S94, Di is converted by the following expression, where d is the distance from the image center to the coordinates Di, H is the distance between the dust and the surface of the image sensor 418. Coordinates Di' after conversion and a radius Ri' after conversion are defined by, for example, $$Di'(x,y)=(L2\times(L1-H)\times d/((L2-H)\times L1))\times Di(x,y)$$

$$Ri'=(Ri\times f1/f2+3)\times 2 \quad (1)$$

The unit is "pixel", and "+3" for Ri' is the margin amount. Ri' is doubled because a region except the dust region is necessary for detecting the dust region by using the average brightness.

In step S95, dust in the region represented by the coordinates Di' and radius Ri' is detected, and interpolation processing is applied as needed. The interpolation processing will be described later in detail. In step S96, it is determined whether dust removal processing is applied to all coordinates. If the processing is complete for all coordinates, the processing ends. Otherwise, the process returns to step S95.

(Interpolation Routine)

Figure 13:
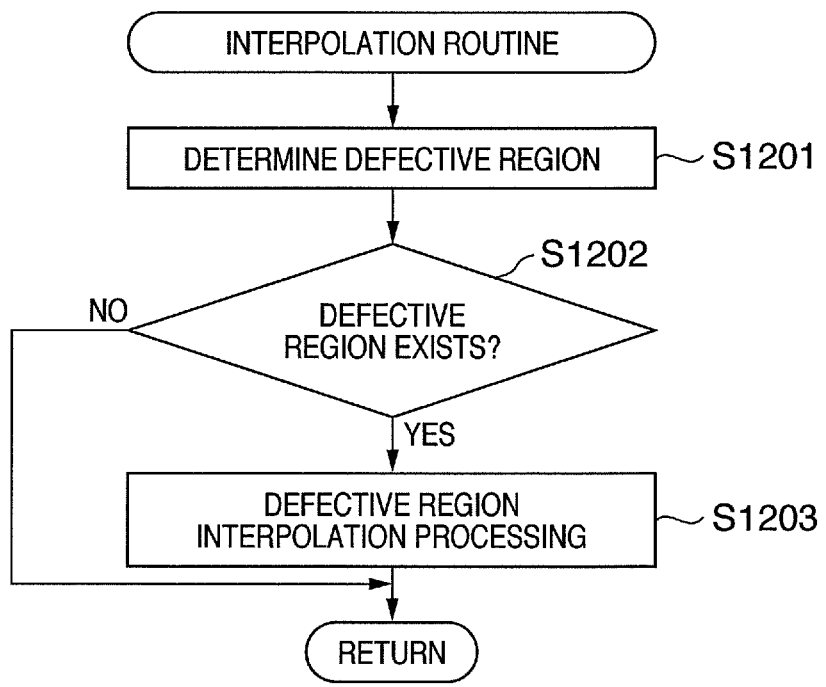
FIG. 13 is a flowchart for explaining details of an interpolation routine.

Interpolation processing of a dust region will be described next in detail. FIG. 13 is a flowchart showing the procedure of the interpolation routine. In step S1201, dust region determination is done. A dust region is a region that satisfies all of the following conditions.

(1) A region having a brightness value smaller than a threshold value T2 which is obtained by $$T2=Yave\times 0.6+Ymax\times 0.4$$

where Yave is the average brightness, and Ymax is the maximum brightness of pixels included in a region represented by the central coordinates Di' and radius Ri' (Di' and Ri' obtained by equation (1)) calculated in step S94 of FIG. 12.

(2) A region that does not contact the circle represented by the central coordinates Di' and radius Ri'.

(3) A region whose radius value calculated in accordance with the same procedure as in step S63 of FIG. 6 is l1 (inclusive) to l2 (exclusive) in an isolated region including low-brightness pixels selected by (1).

(4) A region including the central coordinates Di' of the circle.

In this embodiment, l1 is three pixels, and l2 is 30 pixels. This allows to handle only an isolated small region as a dust region. If it is impossible to accurately acquire the lens pupil position, the condition (4) may appropriately be changed. For example, a region of interest which includes coordinates within the range of ±3 pixels in the X and Y directions from the coordinates Di may be determined as a dust region.

If such a region exists in step S1202, the process advances to step S1203 to execute dust region interpolation. If no region exists, the processing ends. The dust region interpolation processing in step S1203 is executed by a known defective region interpolation method. An example of the known defective region interpolation method is pattern replacement disclosed in Japanese Patent Laid-Open No. 2001-223894. The method of Japanese Patent Laid-Open No. 2001-223894 specifies a defective region by using infrared light. In this embodiment, the dust region detected in step S1201 is handled as a defective region, and pattern replacement is executed to interpolate the dust region by normal pixels in the neighborhood. For a pixel that is not obtained by pattern replacement, p normal pixels are selected in ascending order of distance from the interpolation target pixel in the image data after pattern replacement, and interpolation is executed by using the average color of the pixels.

As described above, since dust correction data is attached to image data, the user need not be aware of the correspondence between dust correction image data and captured image data. Since the dust correction data containing the position, size, and conversion data (aperture value and distance information of the lens pupil position) is compact, the captured image data size can be prevented from excessively increasing. It is also possible to greatly reduce the detection error probability by interpolating only a region including pixels designated by the dust detection processing.

Second Embodiment

In the first embodiment, not the camera body but the separately prepared image processing apparatus executes dust removal processing. In the second embodiment, a method of causing the camera body to execute dust removal processing will be described. A digital camera according to the second embodiment has the same arrangement as in the first embodiment, and a description thereof will be omitted. Only operations different from the first embodiment will be described.

(Dust Removal Routine)

The dust removal routine of the digital camera according to this embodiment executes the same processing as in the flowchart of FIG. 12. This processing is done by causing a microcomputer 402 to execute a dust removal processing program stored in a memory 428.

When the user inputs a dust removal processing start instruction from, for example, a cursor switch 116, the microcomputer 402 loads, to an image processing circuit 425, data corresponding to each pixel of a captured image stored in an image buffer memory 424. The image processing circuit 425 executes the processing shown in FIG. 12 to interpolate dust pixels. The interpolation processing result is recorded in a storage device 419 as a new image file.

The processing in FIG. 12 has already been explained in detail in the first embodiment, and a description thereof will be omitted here.

As described above, according to the above embodiment, the user can properly remove dust without being aware of the correspondence between dust detection image data and normal captured image data. It is also possible to attach data without largely increasing the image data file size even in embedding dust correction data in an image.

Third Embodiment

In the first embodiment, a separately prepared image processing apparatus converts dust correction data attached by the digital camera body by processing it in accordance with the procedure shown in FIG. 12 and then executes dust removal processing.

In the third embodiment, a method of causing the digital camera body to convert dust correction data and attaching the converted dust correction data to a captured image will be described. In this embodiment, since the digital camera body executes conversion, the separately prepared image processing apparatus only needs to execute dust removal processing at designated coordinates.

In step S209 of the image capture processing routine shown in FIG. 9, dust correction data conversion processing is executed (to be described later in detail). The dust correction data is stored in a storage device 419 in association with image data. Since the dust correction data is already converted, it is unnecessary to store the F-number and lens pupil position upon image capturing in the converted dust correction data stored in association with the image data.

Figure 14:
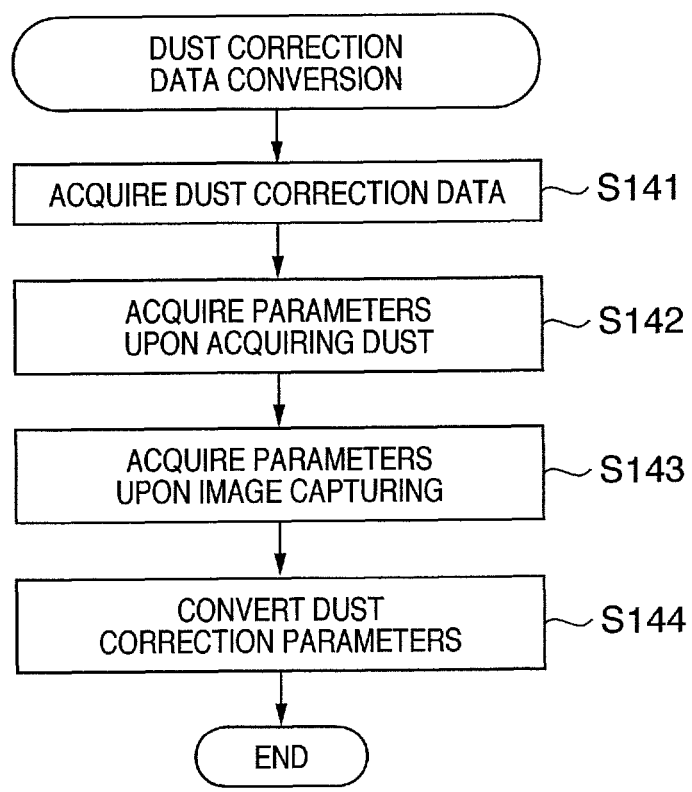
FIG. 14 is a flowchart showing dust correction data conversion processing according to the third embodiment.

FIG. 14 is a flowchart showing the procedure of dust correction data conversion processing.

In step S141, dust correction data stored in a dust position memory 427 is acquired. The process advances to step S142 to acquire, from the dust correction data acquired in step S141, the aperture value and lens pupil position (parameters upon dust acquisition) upon capturing a dust detection image. In step S143, the aperture value and lens pupil position (parameters upon image capturing) upon normal image capturing are acquired. In step S144, the dust correction data is converted on the basis of the parameters upon dust acquisition and the parameters upon image capturing. The process in steps S142 to S144 is the same as in steps S92 to S94 of FIG. 12, and a detailed description thereof will be omitted.

Figure 15:
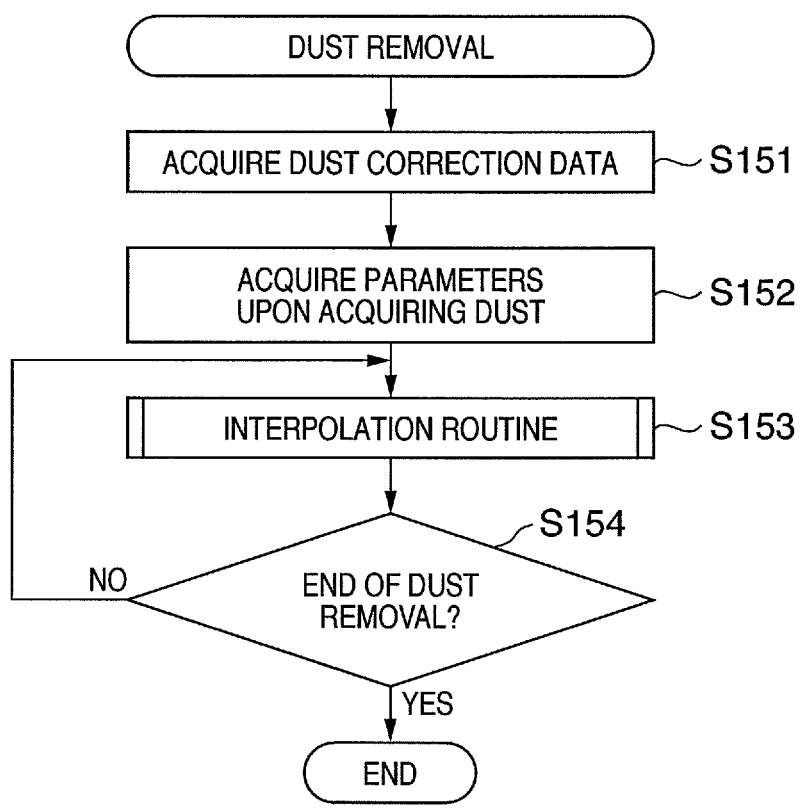
FIG. 15 is a flowchart for explaining dust removal processing according to the third embodiment.

The procedure of dust removal processing by the image processing apparatus will be described next with reference to the flowchart in FIG. 15. The external arrangement of the image processing apparatus according to the third embodiment is the same as that of the first embodiment shown in FIG. 10.

The dust correction data added to the captured image in step S209 is extracted from the normal captured image data (dust removal processing target) (step S151). A coordinate sequence Di (i=0, 1, . . . n) and a radius sequence Ri (i=0, 1, . . . , n) are obtained from the dust correction data extracted in step S151 (step S152).

In step S153, dust in the region represented by the coordinates Di and radius Ri is detected, and interpolation processing is applied as needed. Detailed of the interpolation processing are the same as in the first embodiment. In step S154, it is determined whether dust removal processing is applied to all coordinates. If the processing is complete for all coordinates, the processing ends. Otherwise, the process returns to step S153.

As described above, dust correction data conversion processing on the image processing apparatus side is unnecessary in this embodiment, unlike the first embodiment. Hence, processing on the image processing apparatus side is simple.

Fourth Embodiment

In the dust removal processing described in the first and third embodiments, if coordinates indicated by dust information contains, for example, a face image, an eye may erroneously be determined as a dust region and subjected to interpolation processing.

To prevent this, the position of a face region in a captured image is specified by executing face detection processing, and the region is excluded from the interpolation processing target. This reduces the possibility of interpolation errors for face parts such as an eye and nose. This method is excellent in the following point. Even when a non-face region is erroneously detected as a face region by face detection processing, this has no adverse effect on the original image because the erroneously detected region is excluded from the interpolation processing target.

Interpolation processing when face detection processing is used will be described below.

Face detection processing is done by a known technique. In this embodiment, a method disclosed in, for example, Japanese Patent Laid-Open No. 2004-62651 is used. When this method is used, a rectangle shown in FIG. 3(b) of Japanese Patent Laid-Open No. 2004-62651 can be acquired as a detection result.

In this embodiment, a circle circumscribing a detected rectangle is regarded as a face region, i.e., a dust removal processing omission region, as shown in FIG. 16.

Either the image capturing apparatus side or the external image processing apparatus side can detect the dust removal processing omission region. When the image capturing apparatus side detects the dust removal processing omission region, the information of the dust removal processing omission region (face region), the camera setting values upon image capturing, and the dust correction data are stored in a storage device 419 in association with image data.

Figure 17:
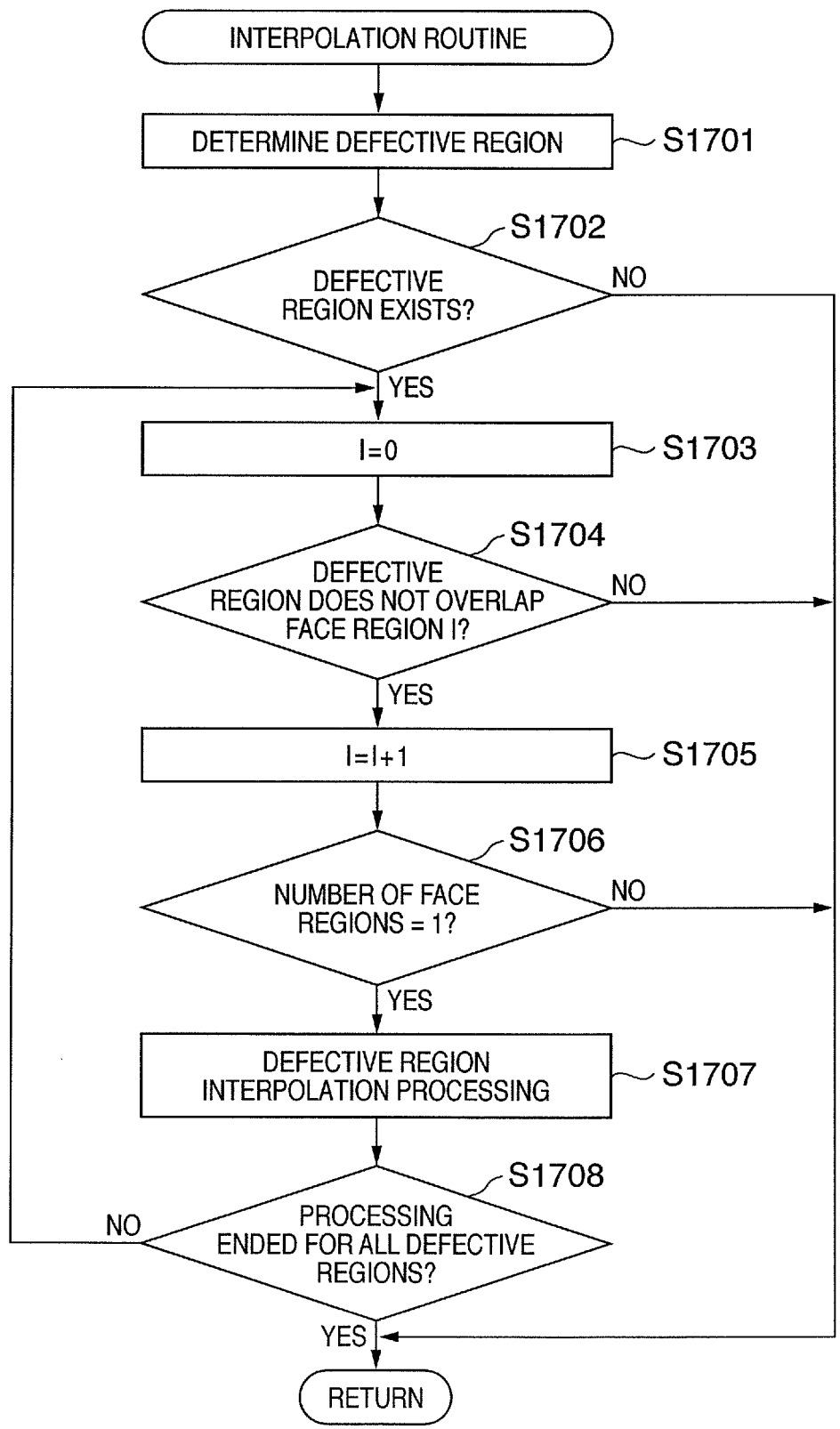
FIG. 17 is a flowchart for explaining an interpolation routine according to the fourth embodiment.

In the interpolation processing routine of this embodiment, a dust region overlapping a dust removal processing omission region is excluded from the interpolation processing target. The procedure of this processing will be described with reference to the flowchart in FIG. 17.

In step S1701, a defective region is determined. The processing contents are the same as in step S1201 of FIG. 13. In step S1702, it is determined whether a defective region exists. If no defective region exists, the processing ends. If a defective region exists, the process advances to step S1703.

In steps S1703 to S1706, it is determined whether each target defective region detected in step S1701 overlaps the dust removal processing omission region detected by face detection processing. If a target defective region does not overlap all the dust removal processing omission regions, the process advances to step S1707 to interpolate the target defective region. Defective region interpolation processing is the same as in step S1202 of FIG. 13, and a description thereof will be omitted.

In step S1708, it is determined whether the processing in step S1703 to S1707 ends for all defective regions detected in step S1701. If the processing ends for all defective regions, the interpolation processing routine ends. If an unprocessed defective region remains, the process returns to step S1703 to repeat steps S1703 to S1708.

Whether a defective region overlaps the dust removal processing omission region is determined in the following way.

(1) Central coordinates C1 and a radius value R1 of the defective region (dust region) detected in step S1701 (same as in step S1201 of FIG. 13) are obtained in accordance with the same procedure as in step S63 of FIG. 6.

(2) A distance L between central coordinates C2 of the dust removal processing omission region and the central coordinates C1 of the dust region is obtained.

(3) When the dust removal processing omission region has a radius value R2, and $$R1+R2>L$$

is satisfied, the dust removal processing omission region overlaps the defective region.

The above-described processing serves to prevent any inappropriate processing result for a region that may be subjected to dust removal processing at a high probability.

Other Embodiment

The object of the embodiments are also achieved by the following method. A storage medium (or recording medium) which records software program codes to implement the functions of the above-described embodiments is supplied to a system or apparatus. The computer (or CPU or MPU) of the system or apparatus reads out and executes the program codes stored in the storage medium. In this case, the program codes read out from the storage medium themselves implement the functions of the above-described embodiments. The storage medium that stores the program codes constitutes the present invention. The functions of the above-described embodiments are implemented not only by causing the computer to execute the readout program codes. The present invention also incorporates the following arrangement. The operating system (OS) running on the computer wholly or partially executes actual processing on the basis of the instructions of the program codes, thereby implementing the functions of the above-described embodiments.

The present invention also incorporates the following arrangement. The program codes read out from the storage medium are written in the memory of a function expansion card inserted to the computer or a function expansion unit connected to the computer. The CPU of the function expansion card or function expansion unit wholly or partially executes actual processing on the basis of the instructions of the program codes, thereby implementing the functions of the above-described embodiments.

The storage medium to which the present invention is applied stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-005396 filed Jan. 12, 2006 and Japanese Patent Application No. 2006-211379 filed Aug. 2, 2006, which are hereby incorporated by reference herein in their entirety.

What is claimed is:

1. An image capturing apparatus comprising:
    an image capture unit configured to generate an image signal by photo-electric conversion of an object image;
    a foreign substance detection unit configured, in a foreign substance detection image capturing mode, to detect, from a foreign substance detection image signal obtained by said image capture unit, foreign substance information that is information of a position and size of a foreign substance in an image sensing plane of said image capture unit;
    a lens information acquisition unit configured, in the foreign substance detection image capturing mode, to acquire lens information of a lens used upon capturing the object;
    a register unit configured, in the foreign substance detection image capturing mode, to register the detected foreign substance information and the acquired lens information;
    a face region detection unit configured, in a normal image capturing mode, to detect a region of a personal face from the captured image signal obtained by capturing the object;
    a recording unit configured, in the normal image capturing mode, to record the detected foreign substance information, the acquired lens information registered by said register unit, and the face region information acquired by said face region detection unit in a file header of captured image data obtained by capturing the object;
    a conversion unit configured to convert the foreign substance information detected by said foreign substance detection unit into second foreign substance information on the basis of the lens information recorded by said recording unit;
    a determination unit configured to determine whether the region of the second foreign substance information is overlapped with the region of the face region information; and
    an interpolation unit configured to interpolate a pixel corresponding to the foreign substance in the captured image data on the basis of the second foreign substance information,
    wherein said interpolation unit interpolates the pixel in a case that the region of the second foreign substance information is not overlapped with the region of the face region information and said interpolation unit does not interpolate the pixel in a case that the region of the second foreign substance information is overlapped with the region of the face region information.

2. The apparatus according to claim 1, wherein the lens information contains information of an aperture value and a pupil position of the lens upon capturing the object.

3. A method of controlling an image capturing apparatus having an image capture unit configured to generate an image signal by photo-electric conversion of an object image, comprising the steps of:
    detecting in a foreign substance detection image capturing mode, from a foreign substance detection image signal obtained by the image capture unit, foreign substance information that is information of a position and size of a foreign substance in an image sensing plane of the image capture unit;
    acquiring in the foreign substance detection image capturing mode, lens information of a lens used upon capturing the object;
    registering in the foreign substance detection image capturing mode, the detected foreign substance information and the acquired lens information;
    detecting in a normal image capturing mode, a region of a personal face from the captured image signal obtained by capturing the object;
    recording in the normal image capturing mode, the detected foreign substance information, the acquired lens information, and information of the detected region of the personal face in a file header of captured image data obtained by capturing the object;
    converting the foreign substance information detected by said foreign substance information detecting step into second foreign substance information on the basis of the lens information recorded by said recording unit;
    determining whether the region of the second foreign substance information is overlapped with the region of the face region information; and
    interpolating a pixel corresponding to the foreign substance in the captured image data on the basis of the second foreign substance information,
    wherein said interpolating step interpolates the pixel in a case that the region of the second foreign substance information is not overlapped with the region of the face region information and said interpolating step does not interpolate the pixel in a case that the region of the second foreign substance information is overlapped with the region of the face region information.

4. The method according to claim 3, wherein the lens information contains information of an aperture value and a pupil position of the lens upon capturing the object.

5. A non-transitory computer-readable medium for storing a program characterized by causing a computer to execute a method of controlling an image capturing apparatus having an image capture unit configured to generate an image signal by photo-electric conversion of an object image, comprising the steps of:

detecting in a foreign substance detection image capturing mode, from a foreign substance detection image signal obtained by the image capture unit, foreign substance information that is information of a position and size of a foreign substance in an image sensing plane of the image capture unit;

acquiring in the foreign substance detection image capturing mode, lens information of a lens used upon capturing the object;

registering in the foreign substance detection image capturing mode, the detected foreign substance information and the acquired lens information;

detecting in a normal image capturing mode, a region of a personal face from the captured image signal obtained by capturing the object;

recording in the normal image capturing model the detected foreign substance information, the acquired lens information, and information of the detected region of the personal face in a file header of captured image data obtained by capturing the object;

converting the foreign substance information detected by said foreign substance information detecting step into second foreign substance information on the basis of the lens information recorded by said recording unit;

determining whether the region of the second foreign substance information is overlapped with the region of the face region information; and interpolating a pixel corresponding to the foreign substance in the captured image data on the basis of the second foreign substance information, wherein said interpolating step interpolates the pixel in a case that the region of the second foreign substance information is not overlapped with the region of the face region information and said interpolating step does not interpolate the pixel in a case that the region of the second foreign substance information is overlapped with the region of the face region information.

6. An image processing apparatus comprising:

image data acquisition unit configured to acquire captured image data that is recorded in association with foreign substance information and face region information;

an interpolation unit configured to interpolate a pixel corresponding to the foreign substance in the captured image on the basis of the foreign substance information, wherein the foreign substance information includes a position information of a foreign substance region in the captured image, wherein the face region information includes a position information of a personal face region in the captured image, wherein the interpolation unit interpolates the pixel in a case that the foreign substance region is not overlapped with the personal face region, and wherein the interpolation unit does not interpolate the pixel in a case that the foreign substance region is overlapped with the personal face region.

7. A method of controlling an image processing apparatus comprising the steps of:

acquiring captured image data that is recorded in association with foreign substance information including a position of a foreign substance region in the captured image, and face region information including a position of a personal face region in the captured image;

interpolating a pixel corresponding to the foreign substance in the captured image on the basis of the foreign substance information, wherein the interpolating step interpolates the pixel in a case that the foreign substance region is not overlapped with the personal face region, and wherein the interpolating step does not interpolate the pixel in a case that the foreign substance region is overlapped with the personal face region.

8. A non-transitory computer-readable medium for storing a program characterized by causing a computer to execute a method of controlling an image processing apparatus comprising the steps of:

acquiring captured image data that is recorded in association with foreign substance information including a position of a foreign substance region in the captured image, and face region information including a position of a personal face region in the captured image;

interpolating a pixel corresponding to the foreign substance in the captured image on the basis of the foreign substance information, wherein the interpolating step interpolates the pixel in a case that the foreign substance region is not overlapped with the personal face region, and wherein the interpolating step does not interpolate the pixel in a case that the foreign substance region is overlapped with the personal face region.

* * * * *